Aug. 25, 1970 R. P. SMITH 3,525,114
WINDSHIELD WIPER SYSTEM
Filed Oct. 17, 1968
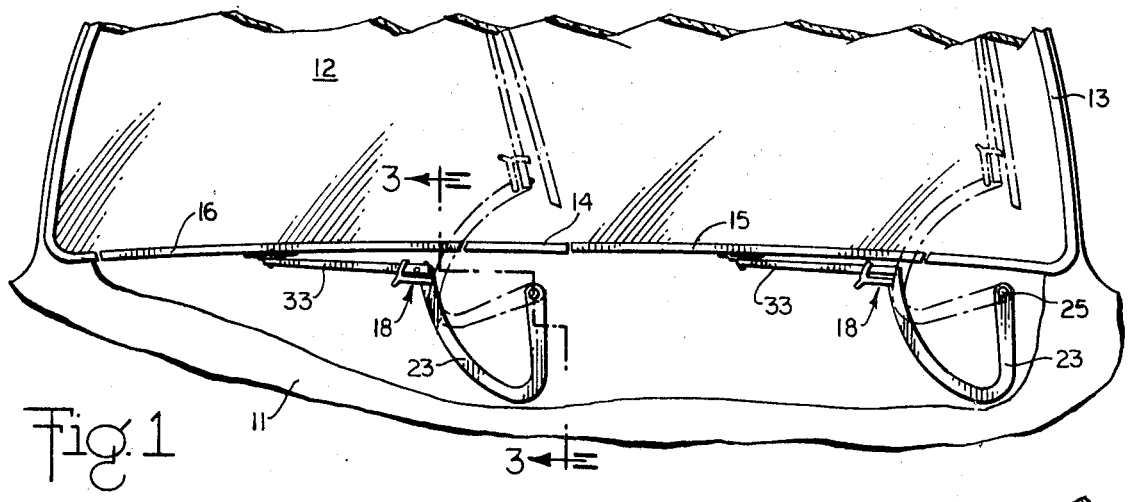
Fig. 1
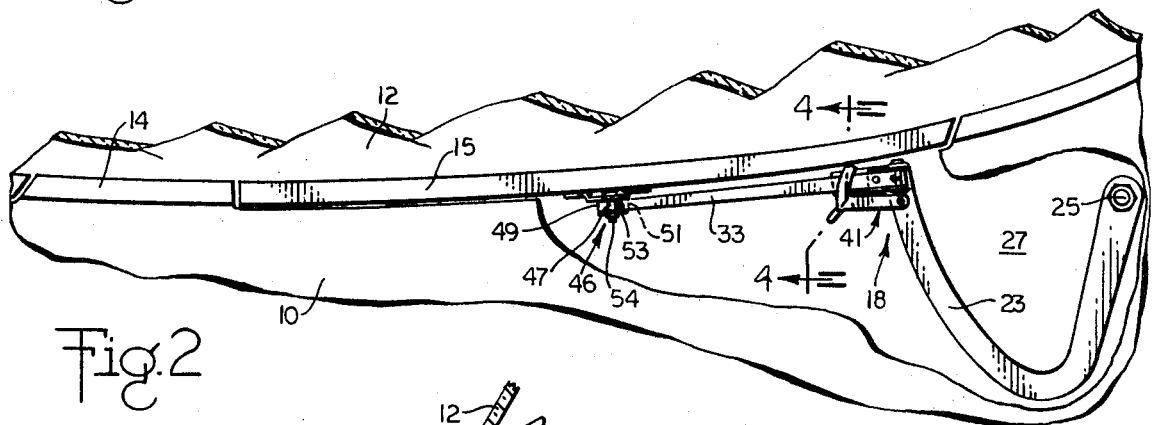
Fig. 2
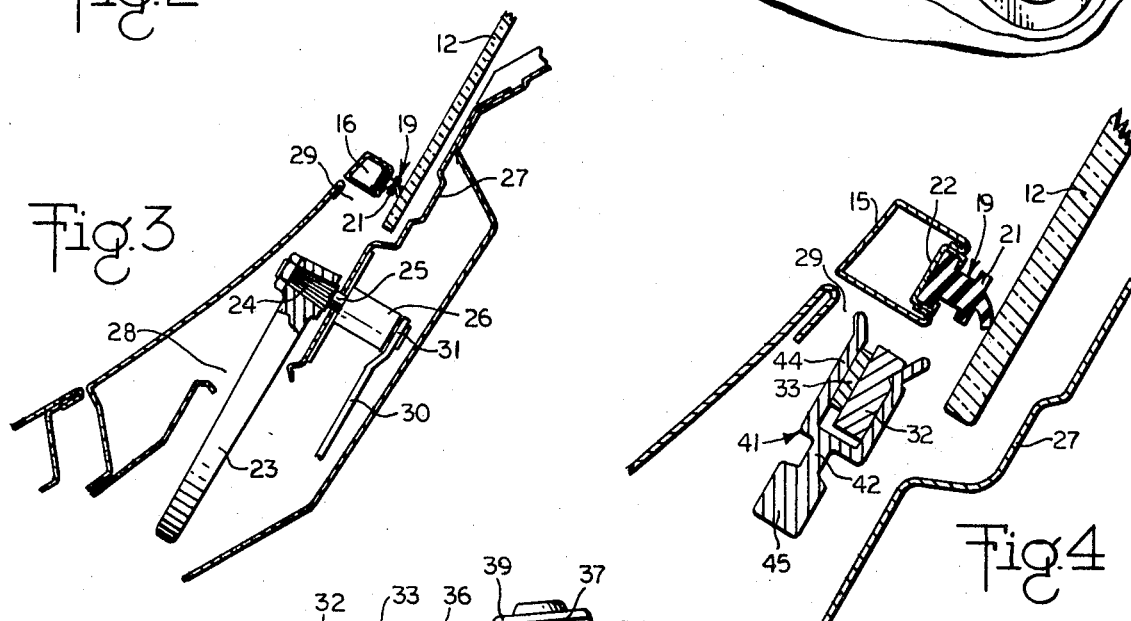
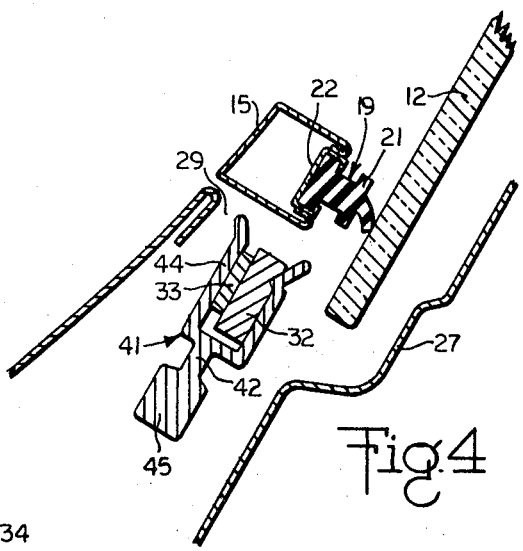
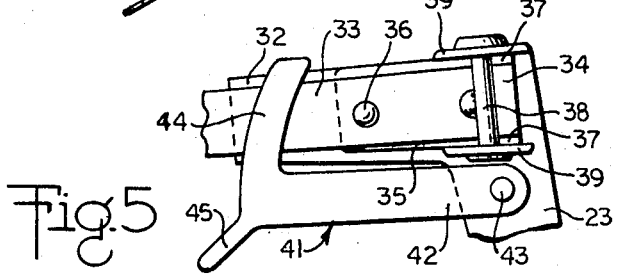
INVENTOR.
RAYMOND P. SMITH
BY John R. Faulkner
John J. Roethel
ATTORNEYS

United States Patent Office 3,525,114
Patented Aug. 25, 1970

3,525,114
WINDSHIELD WIPER SYSTEM
Raymond P. Smith, Southfield, Mich., assignor to Ford Motor Company, Dearborn, Mich., a corporation of Delaware
Filed Oct. 17, 1968, Ser. No. 768,338
Int. Cl. B60s 1/32
U.S. Cl. 15—250.16                                    6 Claims

ABSTRACT OF THE DISCLOSURE

A vehicle body having a windshield and a windshield wiper blade means in wiping engagement with the surface of the windshield. The wiper blade means is mounted on a disconnected section of a reveal molding overlying at least the lower perimetrical edge of the windshield. The disconnected molding section is coupled to a support means operable to swing the reveal molding section and wiper blade carried thereby in a predetermined wiping pattern over the windshield surface.

BACKGROUND OF THE INVENTION

It long has been recognized that the windshield wipers supported in operative relationship to the windshield of a vehicle body are not very attractive appendages to the upper surface of the vehicle cowl structure. The current trend is to conceal the wiper blades, supporting arms and drive mechanism beneath the upper surface of the cowl forwardly of the windshield. During wiping action, the blades and their supporting arms project from a slot extending laterally of the vehicle body between the rear edge of the cowl and the lower edge of the windshield.

There are at least two drawbacks to this method of concealing the windshield wiper blades. First, there is a cost penalty involved in the more complex cowl structure required to provide a laterally extending slot through which the wiper blade and its supporting arm are projected for windshield wiping action. Second, the large laterally extending slot is an inherent trap into which accumulates leaves, other debris and snow.

It is an object of the present invention to camouflage the windshield wiper blade by utilizing a disconnected section of the reveal molding which is used around the perimetrical edge of the windshield as a carrier for the wiper blade.

SUMMARY OF THE INVENTION

The present invention relates to a vehicle body having a windshield and a reveal molding overlying at least the lower perimetrical edge portion of the windshield. The reveal molding at the windshield lower perimetrical edge overlying portion is constructed and arranged to have at least one disconnected section. A windshield wiper blade means is carried by this disconnected section in wiping engagement with the surface of the windshield. A support means pivotally supported on a structural member of the vehicle body beneath the windshield is coupled to the wiper blades carrying reveal molding sections. The support means is operable to swing the reveal molding section and the wiper blade carried thereby in a predetermined wiping pattern over the surface of the windshield.

DESCRIPTION OF THE DRAWING

Other objects, advantages and features of the present invention can be made more apparent as this description proceeds, reference being had to the accompanying drawing wherein:

FIG. 1 is a front elevation of the upper portion of a vehicle body with the windshield and surrounding molding being shown in substantially flat pattern;

FIG. 2 is an enlarged portion of FIG. 1;

FIG. 3 is a vertical section taken substantially on the line 3—3 of FIG. 1; and

FIG. 4 is a sectional view taken substantially on the line 4—4 of FIG. 2; and

FIG. 5 is an enlarged portion of FIG. 2 illustrating the clip device for releasably retaining parts of the mechanism in operaitve relationship.

DESCRIPTION OF THE ILLUSTRATED EMBODIMENT

Referring now to FIG. 1 of the drawing, there is shown a portion of a vehicle body 11 having a windshield 12. The perimeter of the windshield is shown fully encompassed by a reveal molding 13, although for the purpose of the present invention it is only necessary that at least the lower perimetrical portion of the windshield be covered by such a reveal molding. The lower reveal molding section 14 overlying the lower perimetrical portion of the windshield has two disconnected sections 15 and 16, each of which forms a component of a windshield wiper assembly 17 and 18, respectfully. Since the windshield wiper assemblies 17 and 18 are substantially the same, only the wiper assembly 17 will be described in detail.

As noted, the windshield wiper assembly 17 comprises the disconnected section 15 of the lower reveal molding section 14. Carried by the reveal molding disconnected section 15 is a wiper blade unit 19 comprising a conventional resilient elastomeric wiper element 21 mounted in a carrier 22 which is attached to or mounted on the molding section 15 in any conventional manner.

The reveal molding section 15 and the wiper blade unit 19 carried thereby are supported on a support means pivotally mounted on a structural member of a vehicle body beneath the windshield. This support means comprises a curved support arm 23 which is carried on one end 24 of a pivot shaft 25. The pivot shaft 25 is journalled in a bushing 26 mounted on a cowl innerpanel structural member 27, see FIG. 2. The innerpanel structural member has a clearance aperture 28 through which the arm projects as it swings back and forth during windshield wiping operation. There also is a minimal gap 29 between the rear edge of the vehicle body and the lower edge of the windshield through which the support means projects during the wiping cycle.

Swinging movement of the arm 23 is achieved through a rocker arm or link 30 carried on the end 31 of the pivot shaft 25. The rocker arm or link 30 is coupled to a conventional windshield wiper drive mechanism (not shown). The curved support arm 31 at its end opposite its pivotally supported end has a lateral extension 32 which serves as a support platform for one end of a resilient elongated flat member 33. This member 33 lies substantially parallel to the plane of the windshield when in the at rest position shown in FIG. 1. At its right end 34, as viewed in FIG. 1, the resilient member 33 is riveted to a U-shaped bracket 35 by rivets 36. The side walls 37 of the bracket 35 are supported on a pivot stud 38 journalled in spaced ears 39 projecting from the surface of lateral extension 32.

The pivotal mounting of the end 34 of the resilient member 33 permits the latter to be rotated out of the plane of the windshield 12 so that the wiper assembly 17 can be lifted off the glass, as may be necessary to replace the wiper blade unit 19.

The resilient member 33 is releasably held against pivotal movement about the pivot stud 38 by a clamp 41. As best seen in FIGS. 1 and 3, the clamp 41 comprises an elongated flat body portion 42 pivoted at one end to the support arm 23 by a pivot stud 43. The other end of the clamp has an upwardly extending clevis portion 44 which is adapted to resiliently snap over the support arm 23 lateral extension 32 and the portion of the resilient member 33 overlying the latter. Depending from the clevis end of the clamp 41 is a paddle-shaped appendage 45 for manual manipulation of the clamp 41 into and out of clamping position.

The resilient member 33 is coupled to reveal molding section 15 and the wiper blade unit 19 carried thereby through a pivotal coupling 46. The pivotal coupling comprises a pivot stud 47 secured by a bracket 48 to the underside of the reveal molding section 15. The resilient member at its end 49 has a U-shaped bracket 51 secured thereto by rivets 52. The upstanding side walls 53 of the bracket 51 journal the pivot stud 47. A snap ring 54 maintains the components in assembled relationship. It will be noted that the pivot stud or shaft 47 extends from the reveal molding section 15 in a direction substantially parallel to the plane of the windshield in the parked position of the wiper blade means. The function of this pivotal connection between the reveal molding section and the resilient member 33 is to permit the wiper blade to accommodate vertical inclination variations in the windshield contour over the wipe pattern area. The flexibility of the resilient member 33 will assist in such accommodation, but the pivotal coupling is necessary to insure flat contact of the blade with the windshield surface at all angles of inclination as the blade swings back and forth across the windshield.

It is to be understood that this invention is not limited to the exact construction illustrated or described above, but that various changes and modifications may be made without departing from the spirit and scope of the invention as defined by the appended claims.

I claim:
1. In a vehicle body having a windshield,
a reveal molding overlying at least the lower perimetrical edge portion of said windshield,
said reveal molding having at least one disconnected section at the windshield lower perimetrical edge overlying portion,
windshield wiper blade means carried by said disconnected section in wiping engagement with the surface of said windshield,
support means pivotally supported on a structural member of the vehicle body beneath the windshield,
and coupling means coupling said wiper blade reveal molding section to said support means,
said support means being operable to swing said reveal molding section and the wiper blade carried thereby in a predetermined wiping pattern over the surface of said windshield.
2. In a vehicle body according to claim 1, in which:
the coupling means coupling said wiper blade carrying reveal molding section to the support means comprises a pivot shaft extending from the reveal molding section substantially parallel to the plane of the windshield in the parked position of the wiper blade means,
said shaft receiving means on the support means journalling said shaft means,
said reveal molding section and wiper blade means being pivotal about said shaft means to accommodate vertical inclination variations in the windshield contour over the wipe pattern area.
3. In a vehicle body according to claim 1, in which:
the support means comprises a curved arm having one end supported on a shaft extending longitudinally of the vehicle body,
the other end of said curved arm having a lateral extension thereon,
and an elongated resilient member extending from said lateral extension to a point intermediate the ends of the reveal molding disconnected section.
4. In a vehicle body according to claim 3, in which:
the coupling means coupling the wiper blade reveal molding section to the support means comprises a pivot shaft extending from the reveal molding section substantially parallel to the plane of the windshield in the parked position of the wiper blade means,
and shaft receiving means on the resilient member journalling said shaft,
said reveal molding section and the wiper blade means being pivotal about said shaft axis to accommodate vertical inclination variations in the windshield contour over the wipe pattern area.
5. In a vehicle body according to claim 3, in which:
a pivot means couples the resilient member to the curved arm lateral extension for swinging movement about a pivot axis normal to the pivot axis of the curved arm to a position in which the wiper blade is removable from the disconnected molding section,
and clamp means releasably clamping said resilient member to said lateral extension.
6. In a vehicle body according to claim 5, in which:
the coupling means coupling said wiper blade carrying reveal molding section to the support means comprises a pivot shaft extending from the reveal molding section substantially parallel to the plane of the windshield in the parked position of the wiper blade means,
said shaft receiving means on the support means journalling said shaft means,
said reveal molding section and wiper blade means being pivotal about said shaft means to accommodate vertical inclination variations in the windshield contour over the wipe pattern area.

References Cited
UNITED STATES PATENTS 3,290,715  12/1956  Heiler _____ 15—250.19

ROBERT W. MITCHELL, Assistant Examiner

U.S. Cl. X.R.

15—250.19, 250.32, 250.42